United States Patent [19]
Oda et al.

[11] Patent Number: 4,633,379
[45] Date of Patent: Dec. 30, 1986

[54] DC-DC CONVERTER HAVING FEEDBACK TYPE SWITCHING VOLTAGE CONVERTING CIRCUIT

[75] Inventors: Takashi Oda; Takashi Ohyagi; Toshihiro Mori, all of Tokyo, Japan

[73] Assignee: NEC Corporation, Tokyo, Japan

[21] Appl. No.: 651,413

[22] Filed: Sep. 17, 1984

[30] Foreign Application Priority Data

Sep. 30, 1983 [JP] Japan ................... 58-180384

[51] Int. Cl.$^4$ ........................... H02M 3/338
[52] U.S. Cl. ...................... 363/19; 323/281; 363/97
[58] Field of Search ............ 363/19, 23, 97; 323/226, 280, 281, 234, 222

[56] References Cited

U.S. PATENT DOCUMENTS 3,538,424 11/1970 Frederiksen ..................... 323/280
4,283,759 8/1981 Koiki ............................ 363/19
4,451,772 5/1984 Moberg et al. ................. 363/19

FOREIGN PATENT DOCUMENTS 2429567 1/1976 Fed. Rep. of Germany ........ 363/19
54-262 4/1979 Japan ........................... 323/281

OTHER PUBLICATIONS

Fluid, "6V Regulated Supply", Practical Electronics, vol. 17, No. 1, p. 72, Jan. 1981.

*Primary Examiner*—William H. Beha, Jr.
*Attorney, Agent, or Firm*—Sughrue, Mion, Zinn, Macpeak and Seas

[57] ABSTRACT

A DC-DC converter having a high conversion efficiency and stable output voltage. A constant current supply circuit, located between the output terminals of the converter, make it possible for the source current to decrease as a function of battery output voltage, resulting in lower current requirements for a lower required voltage boost and hence increased efficiency.

5 Claims, 9 Drawing Figures

DC-DC CONVERTER HAVING FEEDBACK TYPE SWITCHING VOLTAGE CONVERTING CIRCUIT

BACKGROUND OF THE INVENTION

The present invention relates to the improvement of direct current-to-direct current (DC-DC) converters.

A self-excited DC-DC converter of the prior art is structured by connecting a voltage converting circuit having a feedback loop to a DC power source (dry battery). If the feedback value of the voltage converting circuit is insufficient, this structure will be susceptible to fluctuations in output voltage in response to even slight variations in input voltage. For this reason, a constant-voltage circuit is usually inserted between the dry battery and the voltage converting circuit. The insertion of this constant-voltage circuit, though contributing to the stabilization of the output voltage, has the disadvantage of lowering the conversion efficiency of the converter.

SUMMARY OF THE INVENTION

An object of the present invention, therefore, is to provide a DC-DC converter having a high conversion efficiency and a stable output voltage.

Another object of the invention is to provide a DC-DC converter facilitating temperature compensation.

According to the present invention, there is provided a DC-DC converter comprising feedback type voltage converting means for converting a DC input voltage to provide an output as the output of the DC-DC converter; and output-voltage control circuit means including constant current supply means coupled to the output of the voltage converting means, voltage picking-up means connected to the output of the constant current supply means, and feedback means for feeding back the voltage sensed by the voltage picking-up means to the feedback input end of the feedback type voltage converting means.

BRIEF DESCRIPTION OF THE DRAWINGS

Other objects, features and advantages of the present invention will become more apparent from the detailed description hereunder taken in conjunction with the accompanying drawings, wherein.

DETAILED DESCRIPTION

Figure 1:
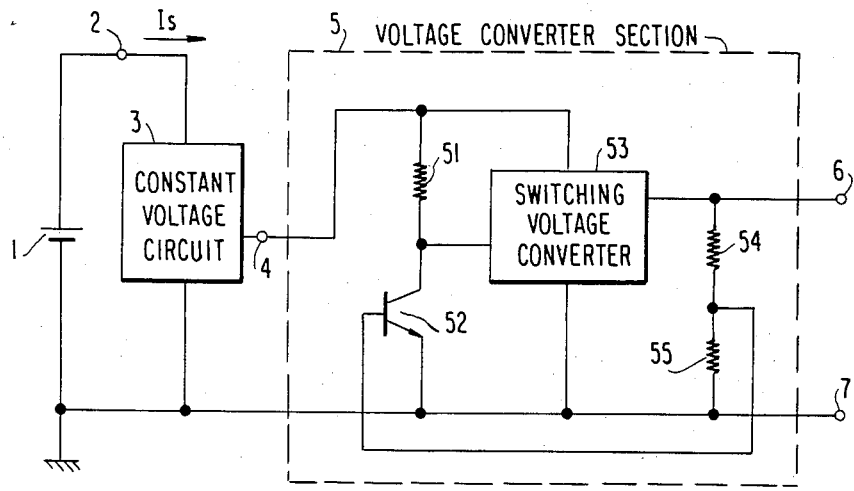
FIG. 1 is a schematic circuit diagram illustrating an example of a DC-DC converter of the prior art.

Referring to FIG. 1, as stated above, a DC-DC converter is composed by connecting in series a constant-voltage circuit 3 and a voltage converter section 5. For instance, while the voltage at an output terminal 2 supplied from a dry battery 1 varies from 1.7 V to 1.0 V, that at a terminal 4 is stabilized at a constant level of 1.0 V by the constant-voltage circuit 3. Afterwards, the voltage at the terminal 4 is boosted by the voltage converter section 5, so that a constant voltage of 2 V can be provided at an output terminal 6.

Let us consider a case in which the constant-voltage circuit 3 is not used, or the voltage converter section 5 is directly driven by the dry battery 1. If the voltage $V_{(open)}$ at the output terminal 6, which indicates that the resistance of a feedback resistor 54 is infinitely great, is sufficiently higher than the desired stabilized output voltage $V_{(STB)}$, the feedback voltage determined by the ratio between resistances of resistors 54 and 55 will stabilize $V_{(STB)}$, which is represented by $$V_{(STB)} = V_{BE}\left(1 + \frac{R_4}{R_5}\right),$$

where $R_4$ and $R_5$ are the resistances of the resistors 54 and 55, respectively, and $V_{BE}$ is the base-emitter voltage of a transistor 52. If $V_{(open)}/V_{(STB)}$ is only about 1.8, no sufficient feedback can be achieved, so that fluctuations in input voltage to the terminal 4 would invite variations in output voltage at the output terminal 6.

Figure 2:
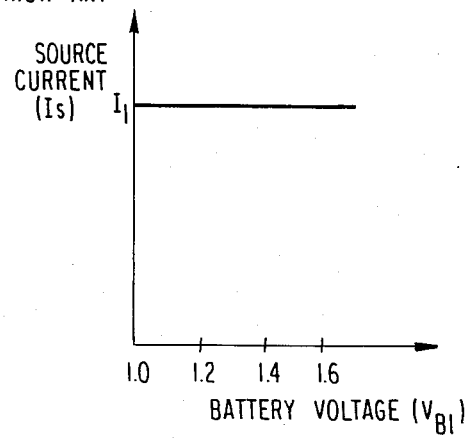
FIGS. 2 and 3 are graphs respectively showing the battery voltage-versus-source current characteristic and the battery voltage-versus-conversion efficiency characteristic of the DC-DC converter shown in FIG. 1.
Figure 3:
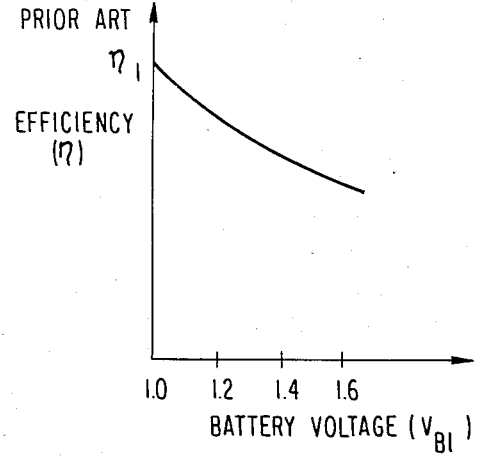

If the constant-voltage circuit 3 is added to such a circuit, the source current, as seen in the graph of FIG. 2, will remain substantially constant at $I_1$ regardless of fluctuations in the voltage from the dry battery 1. The conversion efficiency $\eta_1$ in this case, as shown in the graph of FIG. 3, is represented by $$\eta_1 = \frac{I_L V_L}{I_1 V_{B1}} \qquad (1)$$

where $I_L$ and $V_L$ are the current and voltage, respectively, of the load and $V_{B1}$ is the battery voltage. $I_L$, $V_L$ and $I_1$ are constant values under a quiescent condition. Therefore, the DC-DC converter of FIG. 1, as shown in FIG. 3, has the disadvantage that the efficiency $\eta_1$ declines with a rise in the voltage $V_{B1}$ of the dry battery 1.

Figure 4:
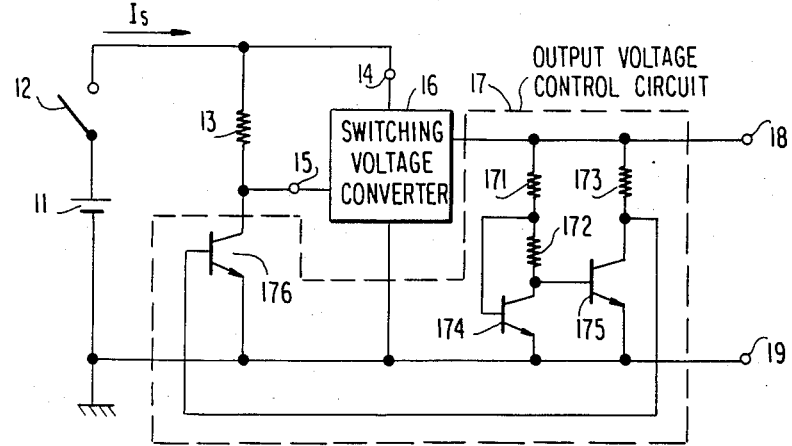
FIG. 4 is a schematic circuit diagram illustrating an embodiment of a DC-DC converter according to the present invention.

Referring now to FIG. 4, a DC-DC converter according to the present invention comprises a dry battery 11, a switch 12, a self-excited type switching voltage converter 16 to which an input voltage is fed via the switch 12, an output-voltage control circuit 17 connected to the output side of the switching voltage converter 16, and a resistor 13 connected between an input terminal 14 and a control input terminal 15 of the switching voltage converter 16. The output-voltage control circuit 17 stabilizes the output of the switching voltage converter 16 to provide a constant voltage output at the terminals 18 and 19. The control circuit 17 includes resistors 171 and 172 and a transistor 174, all connected between output terminals 18 and 19 of the switching voltage converter 16, a transistor 175 whose base is connected to the collector of the transistor 174, and a resistor 173 connected to the collector of the transistor 175. The resistors 171 and 172 and transistors 174 and 175 constitute a constant current supply circuit, which will be described later. The output-voltage control circuit 17 further includes a transistor 176 for providing a feedback signal to the feedback input 15 of the switching voltage converter 16. The feedback signal is picked up by a voltage picking-up element, i.e., the resistor 173. The base of transistor 176 is connected to the collector of transistor 175 and the collector of transistor 176 is connected to the feedback input terminal 15.

Figure 5:
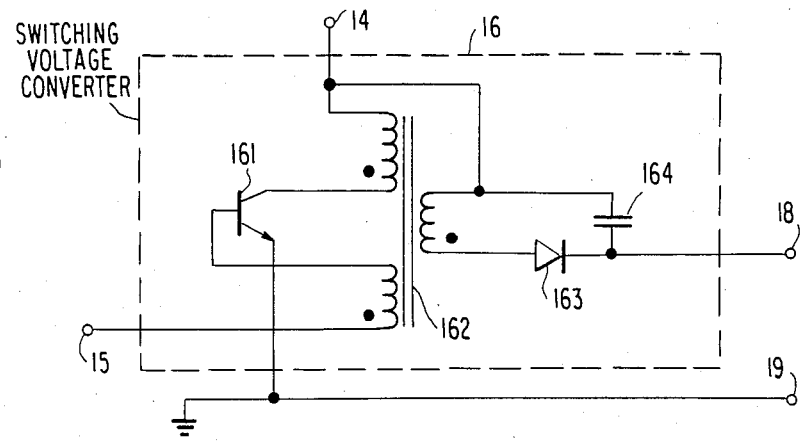
FIG. 5 is a circuit diagram illustrating one example of the voltage converter circuit of the DC-DC converter shown in FIG. 4.

The switching voltage converter 16 is composed as illustrated in FIG. 5. As the switch 12 is turned on, a voltage from the dry battery 11 is fed to the input terminal 14 to let oscillation start automatically, and a high voltage is generated on the output side of a boosting coil 162. The voltage so generated is rectified by a diode 163 and a capacitor 164, and is taken out as a high, boosted DC voltage between the output terminals 18 and 19.

Again referring to the output-voltage control circuit 17 as illustrated in FIG. 4, the output voltage $V_{out}$ between the output terminals 18 and 19 is represented by $$V_{out} = VF_1 + I_{c1} \cdot R_1 = VF_1 + \frac{R_1}{R_2}(VF_1 + VF_2) \quad (2)$$
$$= VF_3 + I_{c2} \cdot R_3$$

where $R_1$ is the resistance of the resistor 171, $R_2$ is that of the resistor 172, $R_3$ is that of the resistor 173, $VF_1$ is the base-emitter voltage of the transistor 174, $I_{c2}$ is the collector current of same, $VF_2$ is the base-emitter voltage of the transistor 175, $I_{c2}$ is the collector current of same, and $VF_3$ is the base-emitter voltage of the transistor 176. Therefore, by selecting the resistances $R_1$, $R_2$ and $R_3$, the base-emitter voltages $VF_1$, $VF_2$ and $VF_3$ and the collector currents $I_{c1}$ and $I_{c2}$ are determined, and it is thereby made possible to set the output voltage $V_{out}$ at any desired level. Further, by selecting $$R_2 \approx 26\text{mV}/I_{c1} \quad (3)$$

for the resistance $R_2$ of the resistor 172, the collector current $I_{c2}$ of the transistor 175 can be made constant, because the collector voltage remains unchanged even if the collector current $I_{c1}$ of the transistor 174 varies as a result of a fluctuation in the voltage at the output terminal 18. Therefore, it is only necessary to select the resistance $R_3$ of the resistor 173 so as to set the output voltage $V_{out}$ at any desired level according to Equation (2) above. Incidentally, the value of 26 mV in Equation (3) is calculated by the use of KT/q, where K is Boltzmann's constant, T is an absolute temperature, and q is an electric charge.

Since the circuit component constants are selected in this manner to let a feedback signal be supplied from the collector of the transistor 175 to the base of the transistor 176, the oscillation frequency of the switching voltage converter 16 is controlled by the output signal of the transistor 176, and a stabilized, converted voltage is provided at the output terminals 18 and 19. Thus, it is seen that this converted voltage is determined by the resistances $R_1$, $R_2$ and $R_3$ of the resistors 171, 172 and 173, respectively, but not affected by any voltage fluctuation of the dry battery 11. In this way, the stabilization of the output voltage is unaffected unlike in the prior art because, even if the feedback by the transistor 176 drops, the output voltage is determined by the relationship of Equation (2) above. Further, if the voltage supplied from the dry battery rises, the voltage boost (the ratio of the converted voltage to the battery voltage) will correspondingly decrease, resulting in the advantage of a saving in current consumption.

Figure 6:
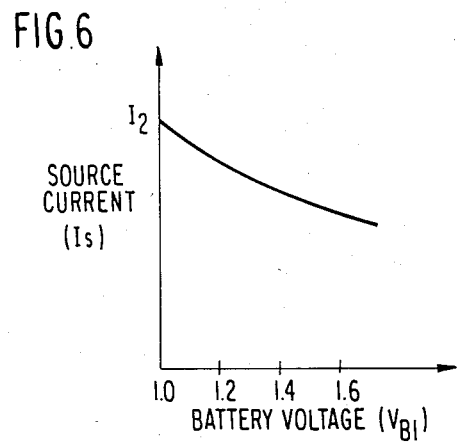
FIGS. 6 and 7 are graphs respectively showing the battery voltage-versus-source current characteristic and the battery voltage-versus-conversion efficiency characteristic of the DC-DC converter shown in FIG. 4.
Figure 7:
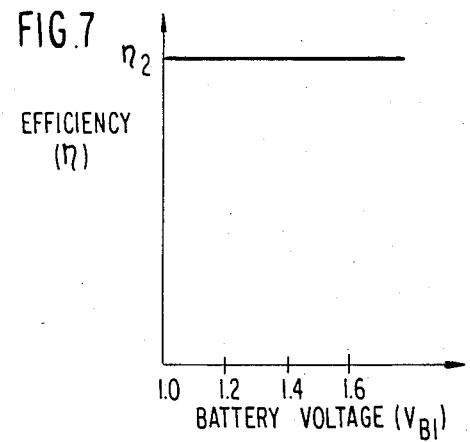

The graphs of FIGS. 6 and 7 show the variation characteristics of the source current and conversion efficiency, respectively, relative to battery voltage fluctuations, attained with the embodiment of FIG. 4. As these graphs indicate, the source current $I_s$ declines with a rise in battery voltage $V_{B1}$, so that the efficiency $\eta$ remains constant irrespective of the battery voltage $V_{B1}$. When the battery voltage $V_{B1}$ is 1.4 V, for instance, a 30% improvement will be achieved over the efficiency $\eta_1$ of the conventional circuit. This embodiment makes it possible to keep the voltage fluctuation rate relative to the input voltage at about 3%/V when the fluctuation range of the battery voltage is from 1.0 to 1.7 V and the stabilized output voltage is set at 2.0 V, which means an improvement by about 1/2.6 over the approximately 8%/V rate of the conventional circuit.

Figure 8:
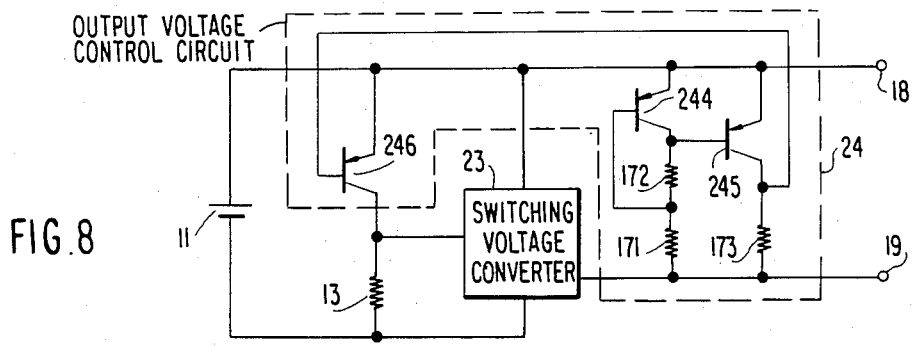
FIG. 8 is a schematic circuit diagram illustrating another embodiment of a DC-DC converter according to the invention.

FIG. 8 is a circuit diagram illustrating a second preferred embodiment of the present invention. This embodiment differs from the first embodiment in that the PNP type transistors 244 to 246 are used instead of the NPN type transistors 174 to 176 in the first embodiment shown in FIG. 4 and in that, in connection with that change, the voltage on the negative side is stabilized with reference to the battery voltage. However, the second embodiment is no different from the first one in any other respect either in structure or in operation. In FIG. 8, reference numeral 24 denotes an output voltage control circuit, and 23, a switching voltage converter.

Figure 9:
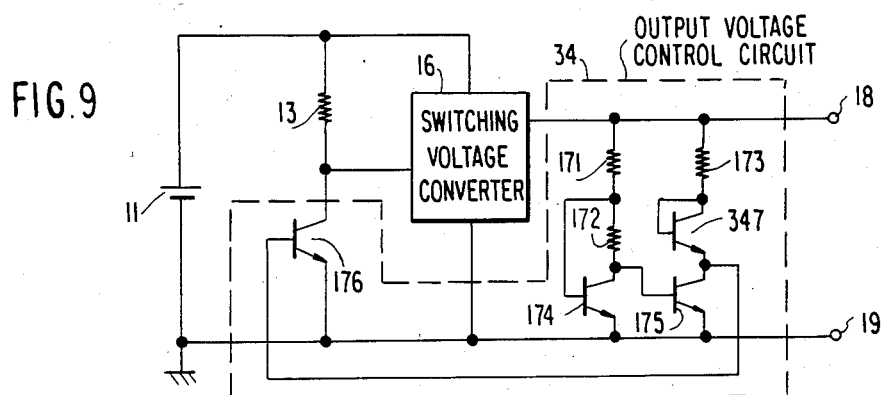
FIG. 9 is a schematic circuit diagram illustrating still another embodiment of a DC-DC converter according to the invention.

FIG. 9 is a circuit diagram illustrating a third preferred embodiment of the present invention. This circuit differs from the first embodiment in that a transistor 347 having a diode characteristic is connected in series to a resistor 173 as the collector load of a transistor 175. But, the third embodiment is no different from the first one in any other respect either in structure or in operation. The insertion of the transistor 347 is intended to suppress the fluctuations of the output voltage resulting from changes in ambient temperature. Thus, the current change of the transistor 347 due to temperature changes compensates for the fluctuations in the output voltage of the converter circuit which result from the temperature changes.

Though a diode-connected transistor is used for temperature compensation in this embodiment, the invention is not limited to this embodiment, but obviously a diode or a thermistor having a desirable temperature characteristic for the compensatory purpose can be used as well, or more than one such unit can be employed.

As is evident from the foregoing description, in the DC-DC converter according to the present invention, an output-voltage control circuit is connected to the output side of a voltage converter circuit, which is controlled by this output-voltage control circuit. Therefore, not only can a stabilized, boosted voltage be provided even if the feedback value to the voltage converter circuit is small, but also the conversion efficiency can be kept constant within the fluctuation range of the battery voltage. Furthermore, temperature compensation can be readily achieved merely by connecting in series a diode or the like to the collector load resistance.

What is claimed is:

1. A DC-DC comprising:
    feedback type switching voltage converting means for converting a DC input voltage to an output voltage in accordance with a control voltage provided at a feedback input thereof;
    constant current supply means responsive to the output of said switching voltage oonverting means for producing a constant current;
    voltage stabilizing and picking-up means responsive to said constant current for stabilizing the output voltage of said switching voltage converting means and pickup up the output voltage to provide a feedback voltage; and
    feedback means for providing said feedback voltage to said feedback input as said control signal.

2. A DC-DC converter, as claimed in claim 1,
    wherein said constant current supply means comprises a first resistor having first and second ends, said first end being connected to one output end of said voltage converting means;
    a first transistor having a base and an emitter which are respectively connected to said second end of said first resistor and a second output end of said voltage converting means;
    a second resistor connected between a base and a collector of said first transistor; and
    a second transistor having a base, a collector and an emitter which are respectively connected to the collector of said first transistor, one end of said voltage stabilizing and picking-up means and the second output end of said voltage converting means, and wherein
    said feedback means comprises a third transistor having a base, a collector and an emitter which are respectively connected to the collector of said second transistor, said feedback input and the second output end of said voltage converting means.

3. A DC-DC converter, as claimed in claim 2, wherein
    said voltage stabilizing and picking-up means comprises a resistor connected between the collector of said second transistor and said one output end of said switching voltage converting means.

4. A DC-DC converter as claimed in claim 2, further comprising a temperature compensating element, connected in series to said voltage stabilizing and picking-up means, for compensating for fluctuations in the output voltage of said switching voltage converting means resulting from temperature changes.

5. A DC-DC converter as claimed in claim 4, wherein said element comprises a diode-connected transistor connected between one end of said voltage stabilizing and picking-up means and the collector of said second transistor.

* * * * *

UNITED STATES PATENT AND TRADEMARK OFFICE
CERTIFICATE OF CORRECTION

PATENT NO. : 4,633,379
DATED : December 30, 1986
INVENTOR(S) : Takashi ODA, Takashi OHYAGI, Toshihiro MORI It is certified that error appears in the above-identified patent and that said Letters Patent is hereby corrected as shown below:

| | |
|---|---|
| COLUMN 3, LINE 33 | Delete "$I_{c2}$" and insert --$I_{c1}$-- <br> page 7, line 5 (PTO) |
| COLUMN 5, LINE 4 | Insert --converter-- between "DC" and "comprising" <br> Amdt. filed 3/18/86 (PTO) |
| COLUMN 5, Line 15 | Delete "pickup" and insert --picking-- <br> Amdt. filed 3/18/86 (PTO) |

Signed and Sealed this

Seventeenth Day of March, 1987

Attest:

DONALD J. QUIGG

Attesting Officer

Commissioner of Patents and Trademarks